United States Patent Office 2,749,136
Patented June 5, 1956

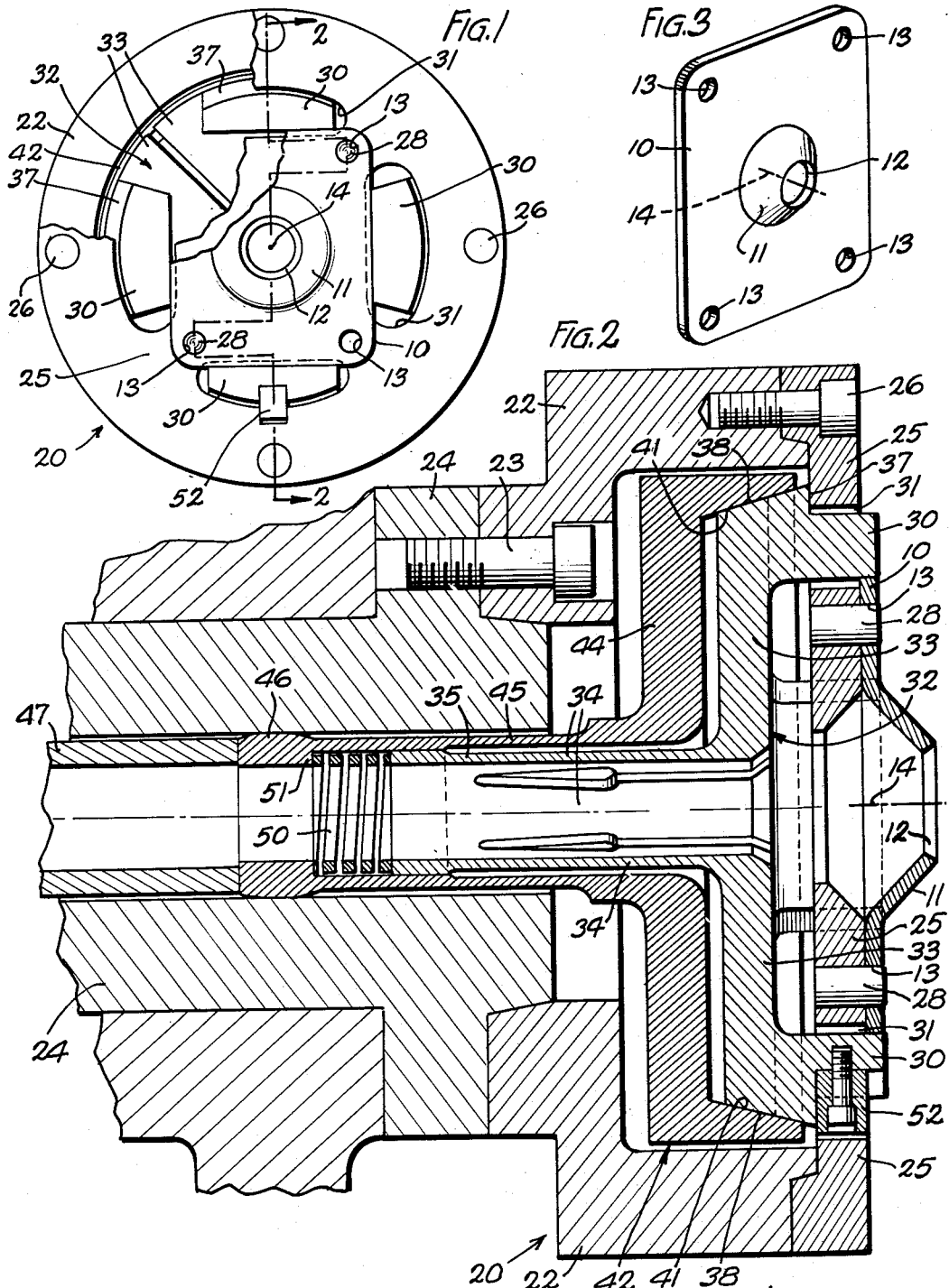
June 5, 1956  F. W. SMERZ  2,749,136
CHUCKS FOR ALIGNING AND CLAMPING PARTS THEREON
Filed April 17, 1953
INVENTOR
F. W. SMERZ
BY C. H. Hamilton, ATTY.

2,749,136

CHUCKS FOR ALIGNING AND CLAMPING PARTS THEREON

Frank W. Smerz, Riverside, Ill., assignor to Western Electric Company, Incorporated, New York, N. Y., a corporation of New York Application April 17, 1953, Serial No. 349,434

6 Claims. (Cl. 279—50)

This invention relates to chucks for supporting parts for rotation and more particularly to chucks for aligning parts thereon and clamping the parts in the aligned position.

It is an object of the present invention to provide an improved chuck having means for accurately aligning a part thereon and for clamping the part in said aligned position.

In one embodiment of the invention as applied to a chuck for positioning a part having a plurality of marginal holes in predetermined spaced relation to a central axis and through which part it is desired to bore an aperture concentric with the central axis, there is provided a positioning member which is fixed to a rotatable spindle and has a surface engageable with the part for supporting the part against axial movement in one direction, and the positioning member has a pair of pins thereon engageable in a pair of the holes in the part to accurately position the part with the central axis thereof in coaxial alignment with the spindle, and a collet which has a plurality of jaws engageable with the edge portions of the part is actuatable by an axially movable and radially displaceable element to clamp the part in aligned position.

Other objects and advantages of the invention will become apparent by reference to the following detailed description and the accompanying drawings illustrating a preferred embodiment thereof, in which Fig. 1 is a face view of the chuck with portions broken away;

Fig. 2 is a longitudinal sectional view through the chuck taken on the line 2—2 of Fig. 1; and Fig. 3 is a view in perspective of a piece part adapted to be supported in the chuck.

The present chuck is designed to receive a piece part 10 (Fig. 3) in the form of a flat rectangular plate stamped from sheet metal and having a central boss 11 provided with an unfinished aperture 12 and having four marginal holes 13 drilled therein adjacent the corners of the plate in accurate predetermined relation to each other and to a central axis 14 extending through the part 10 and the aperture 12, and the chuck is adapted to align and support the part 10 thereon with the central axis 14 coaxial with the axis of rotation of the chuck to permit the unfinished aperture 12 to be bored to an enlarged predetermined size concentric with the axis 14. The distance from the holes 13 to the edges of the part 10 may vary slightly so that the edges of the part cannot be used as gaging surfaces for accurately positioning the part 10 on the chuck preparatory to boring out the aperture 12 to a predetermined size. The cylindrical surfaces of the holes 13, however, provide gaging surfaces which may be used for accurately positioning the part to allow for the boring of the aperture concentric with the axis 14 and in predetermined spaced relation to the holes 13.

The chuck 20 includes a cap which comprises an annular member 22 secured by screws 23 to the end flange of the spindle 24 of a screw machine and an annular plate or positioning member 25 secured to the member 22 by screws 26. The positioning member 25 has a flat face perpendicular to the axis of the spindle and engageable with the rear face of a part 10 for supporting the part against axial movement in one direction, and the member 25 has a pair of axially directed aligning pins 28 projecting therefrom and engageable in a pair of diametrically opposed holes 13 in the piece part. The pins 28 are spaced equi-distant from the axis of the spindle in diametrically opposed relation to each other and the peripheries thereof form gaging surfaces engageable with the gaging surface of the holes 13 in the part 10 to accurately locate the part 10 in a predetermined position on the member 25 with the axis 14 coaxially aligned with the spindle.

The part 10 is adapted to be clamped along the edge thereof by a plurality of jaws 30 which extend through apertures 31 in the member 25 and are formed on a collet 32. The collet has a disc portion which has radial slots dividing it into four segments 33, each of which has a jaw 30 thereon. At their inner ends, the segments 33 have axially directed cylindrical spring members 34 which are connected together at their ends and form a sleeve 35. The spring members 34 support the jaws 30 for movement radially into and out of engagement with the edge portions of the piece part 10 and serve to yieldably retain the jaws 31 in their normal outer position. Adjacent the jaws 30, each of the segments 33 is provided with a shoulder 37 engageable with the inner face of the member 25 and each of the segments 33 is provided with a conical surface 38 engageable with a conical cam surface on the annular cam 41 of a collet actuating element or chuck sleeve 42. The cam 41 of the collet actuating element is formed as a forwardly directed flange on the outer portion of an annular disc 44, which, at its inner portion, has an axially directed sleeve portion 45 extending rearwardly therefrom in telescoping relation around the sleeve 35 and within the hollow spindle 24. The sleeve 45 is shaped to provide a clearance between the outer diameter thereof and the inner diameter of the spindle 16, except for an enlarged relatively short end portion 46 on the sleeve which is slidably engageable with the inner periphery of the spindle and permits a tilting movement of the actuating element 42 and a limited radial movement of the disc portion 44 thereof. Clearance is provided between the outer periphery of the disc portion 44 and the inner surface of the annular member 22 to permit this limited radial movement of the forward end of the collet actuating element 42. Clearance is also provided between the sleeve 45 and the spring members 34 and sleeve 35 except for an enlarged end portion of the sleeve 35, which slidably engages the inner periphery of the sleeve 45.

Axial movement is imparted to the collet actuating member 42 to actuate the jaws 30 by a chuck tube 47 disposed within the hollow spindle 16 and in engagement with the end of the sleeve 45. A spring 50, interposed between the end of the sleeve 35 and a shoulder 51 on the sleeve 45, urges the collet actuating element 42 rearwardly to release the jaws 30 and urges the collet 32 forwardly to maintain the shoulders 37 thereof in engagement with the member 25. A key 52 fixed to one of the jaws 30 is slidable radially in a keyway in the member 25 and connects the collet 32 to the member 25 for rotation therewith.

As stated previously, the distance from the holes 13 to the adjacent edges of the parts 10 may vary and when the part is supported on the positioning pins 28 of the chuck, the opposite edges of the part 10 may be located different distances from the axis of the spindle. Thus, when the jaws 30 are required to move through different distances to engage the edges of a part 10 supported on the aligning pins 28, the floating collet actuating element may move radially to impart greater movement to some of the jaws 30. In other words, the position of the jaws 30 when they are in engagement with the part 10, determines the position of the collet actuating element 42, which adjusts itself radially into whatever position the jaws guide it in response to the forward movement of the actuating element.

Thus, while the jaws 30 may be positioned different distances from the axis of the spindle as they grip some of the parts 10, the parts are always properly positioned with the central axis thereof coaxial with the spindle and with the face of the part in a plane perpendicular to the axis of the spindle.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A chuck for aligning and supporting a part having gaging surfaces thereon comprising an aligning member connectible to a spindle for rotation therewith and having relatively fixed gaging surfaces extending in an axial direction and engageable with the gaging surfaces on said part for supporting the part on said aligning member in a predetermined position transversely of the axis of rotation, a collet having a plurality of jaws mounted for rotation with said aligning member and for radial movement into engagement with the part, and a floating element mounted for axial and transverse movement for actuating said collet to move the jaws into gripping engagement with the part to hold it in said predetermined position.

2. A chuck for aligning and supporting a part having marginal holes therein comprising an aligning member connectible to a spindle for rotation therewith and having a pair of axially directed pins engageable in holes in said part for aligning the part in a predetermined position transversely of the axis of the spindle and having a surface for limiting the axial movement of said part in one direction, a floating collet having a plurality of jaws mounted for rotation with said member and for radial movement from a normally open position into engagement with the part, and a floating element mounted for axial and transverse movement for actuating said collet and the jaws thereon to clamp the part in aligned position.

3. A chuck for aligning and supporting a part having gaging surfaces thereon comprising an aligning member connectible to a spindle for rotation therewith and having relatively fixed surfaces engageable with the gaging surfaces on said part for supporting the part thereon in a predetermined position transversely of the axis of rotation, a plurality of jaws movable transversely of said axis from a normally open position into engagement with the part and having cam surfaces thereon, means mounting the jaws for rotation with said aligning member, and a floating element mounted for axial and radial movement and having cam surfaces cooperable with the cam surfaces of said jaws for actuating said jaws into clamping engagement with the part to hold it in said predetermined position.

4. In a device of the type described for aligning and clamping a part having edge portions and gaging surfaces, the combination with a hollow spindle of a plate having a plurality of apertures therein, means for securing said plate on said spindle for rotation therewith, said plate having a surface disposed perpendicularly to the axis of said spindle for supporting a part against movement in an axial direction and having a plurality of elements provided with axially extending gaging surfaces engageable with the gaging surfaces on said part for supporting said part in a predetermined position on said plate, a collet having a plurality of clamping jaws extending through the apertures in said plate and movable radially from a normal outer position into engagement with the outer edges of said part, means interconnecting the collet and the plate for rotation together, an actuating element having an annular portion provided with cam surfaces for actuating said jaws into clamping engagement with said part, means mounting said actuating element for axial movement and for limited radial movement, and a member disposed within said hollow spindle for imparting axial movement to said actuating element.

5. In a device of the type described for aligning and clamping a part having clamping portions and gaging surfaces thereon, the combination with a spindle of a positioning member having a plurality of apertures therein, means mounting said positioning member on said spindle in fixed relation thereto, said positioning member having a surface disposed transversely of the axis of said spindle for positioning a part axially in one direction and having a plurality of axially extending relatively fixed gaging surfaces engageable with the gaging surfaces on said part for supporting said part in a predetermined position on said positioning member, a collet having a plurality of jaws extending through the apertures in said positioning member and movable radially from a normal open position into a closed position in clamping engagement with the clamping portions of said part, means for interconnecting the collet and the positioning member for rotation together, an element having cam portions engageable with said jaws for actuating said jaws into clamping engagement with said part in response to axial movement of said element, means mounting said element for axial and radial movement, and a member for imparting axial movement to said element.

6. A chuck for aligning and supporting a part having gaging surfaces thereon comprising a body member rotatable about a predetermined axis, aligning means on said body member having a plurality of relatively fixed axially directed aligning members in a predetermined spaced relation to said axis engageable with the gaging surfaces of said part for supporting the part in a predetermined position relative to said axis and against radial movement, floating clamping means including a plurality of jaws for gripping the part mounted for rotation with said body member and for movement relative thereto transversely of said axis, and a floating actuating element mounted for rotatable movement with said body member and axial movement relative thereto for actuating said jaws of said clamping means into clamping engagement with said part for holding said part in said predetermined position.

References Cited in the file of this patent

UNITED STATES PATENTS

| 668,286 | Freese | Feb. 19, 1901 |
| 1,232,735 | Torvik | July 10, 1917 |
| 1,499,728 | Hanson | July 1, 1924 |